United States Patent
Futral et al.

[19]

[11] Patent Number: 5,991,797
[45] Date of Patent: Nov. 23, 1999

[54] METHOD FOR DIRECTING I/O TRANSACTIONS BETWEEN AN I/O DEVICE AND A MEMORY

[75] Inventors: William T. Futral; Greg J. Regnier, both of Portland, Oreg.

[73] Assignee: Intel Corporation, Santa Clara, Calif.

[21] Appl. No.: 08/997,102

[22] Filed: Dec. 23, 1997

[51] Int. Cl.[6] .................................................. G06F 13/00
[52] U.S. Cl. ............................................................ 709/216
[58] Field of Search ........................... 709/100, 208–216, 709/224–232, 237–238; 710/5–7, 22–28, 36–51, 200, 240–244

[56] References Cited

U.S. PATENT DOCUMENTS

| | | | |
|---|---|---|---|
| 5,088,031 | 2/1992 | Takasaki et al. | 709/100 |
| 5,473,761 | 12/1995 | Parks et al. | 711/4 |
| 5,568,402 | 10/1996 | Gray et al. | 709/224 |
| 5,644,712 | 7/1997 | Coscarella | 710/9 |
| 5,655,146 | 8/1997 | Baum et al. | 710/5 |
| 5,713,044 | 1/1998 | Gillepie et al. | 710/22 |

*Primary Examiner*—Christopher B. Shin
*Attorney, Agent, or Firm*—Steven P. Skabrat

[57] ABSTRACT

A first host system directs an I/O device to transfer data directly between a requesting application program's buffers on a second host system and an I/O unit coupled to the I/O device without the need to pass through the first host system. Since the first host system retains control of the I/O request, it maintains security and protection features at the same time as realizing increases in performance gained from not having to participate in the actual data transfer. This direct movement capability supports peer-to-peer operation where a number of different I/O units, each with its own physical memory addressing domain, require access to the same I/O device. The direct movement capability is also useful in clustered systems. Clustered host systems are allowed direct access to an I/O device for data transfer without intervention by the host system owning the I/O device.

16 Claims, 6 Drawing Sheets

METHOD FOR DIRECTING I/O TRANSACTIONS BETWEEN AN I/O DEVICE AND A MEMORY

BACKGROUND OF THE INVENTION

1. Field of the Invention

The present invention relates generally to computer systems and more specifically to the transfer of data during an input/output transaction to memory controlled by an application program.

2. Description of Related Art

Current input/output (I/O) technology for computer systems provides for a single I/O device driver program controlling an I/O device, with that I/O device driver executing as a component of operating system (OS) software solely within the OS environment on a host system. The OS directly controls I/O operations between the I/O device and its physical memory. If another host system wants access to the I/O device, it must request service from the OS on the host system owning the I/O device. Thus, the OS regulates all access to the I/O device as a single source for I/O requests to the I/O device. In simple single I/O unit or single host system operating environments this is sufficient, but in clustered environments (or even in single processor environments where the application program requesting the I/O transaction resides in an I/O channel), the I/O device driver in the OS must move the data at least twice. For an I/O write operation, the OS first copies the data from the original location in memory assigned to the requesting application program on one host system to a memory space in a second host system that controls the I/O device. This second host system then issues the I/O command to the I/O device to send the data. For an I/O read operation, the OS of the second host system causes the I/O device to move the data into a buffer controlled by the OS, and then forwards the data to the memory in the second host system. The second host system then forwards the data from its memory to the memory assigned to the requesting application program in the first host system.

Figure 1:
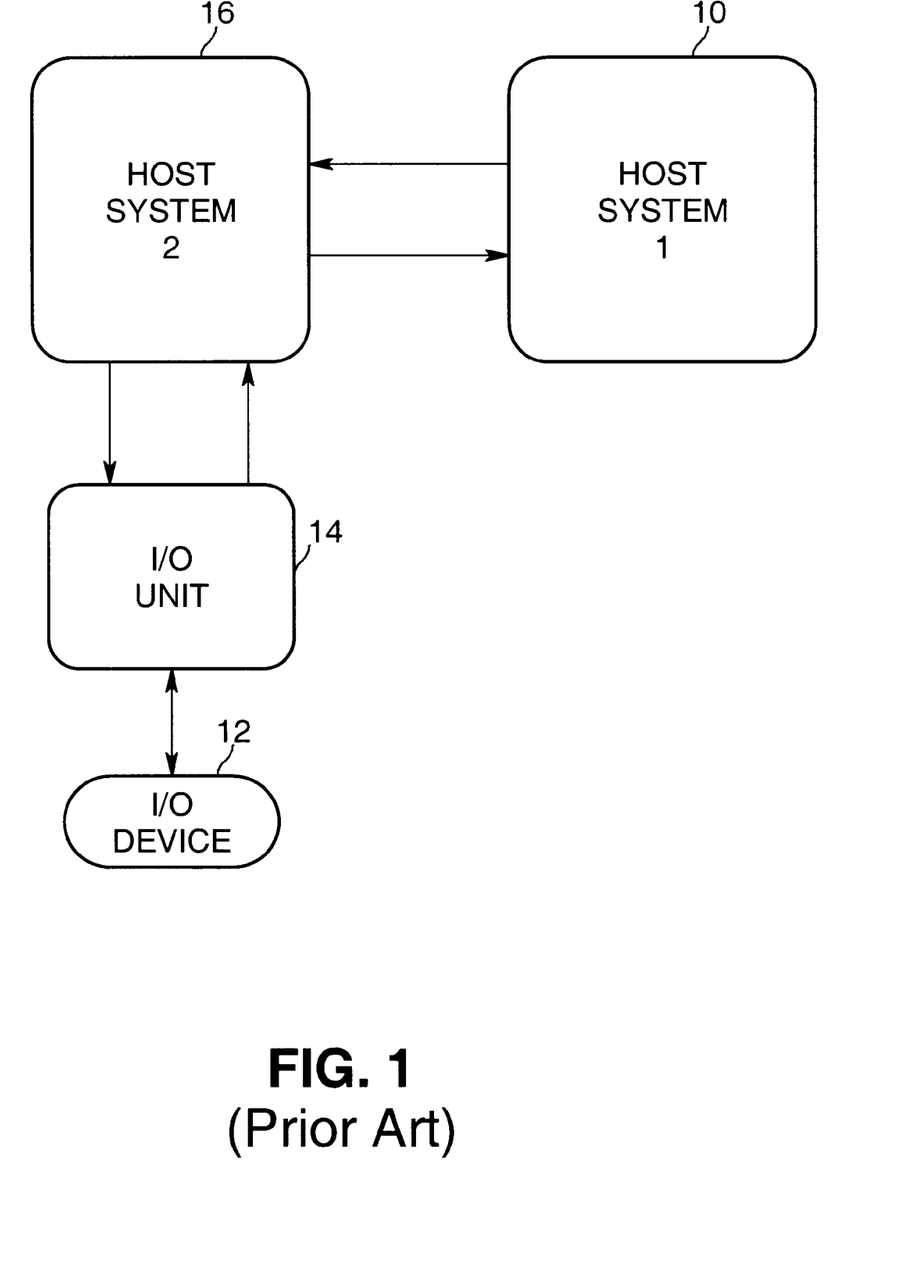
FIG. 1 is a diagram illustrating the double movement of I/O data (Prior Art).

FIG. 1 is a prior art diagram illustrating the double movement of I/O data when a remote process on a first host system is requesting service from an I/O device controlled by a second host system. Host System 1 10 desires to read from or write data to I/O Device 12. The I/O Device 12 is controlled by I/O Unit 14, which is coupled to Host System 2 16. In a first example where an I/O read is requested, Host System 1 10 sends a request to Host System 2 16 for I/O service from the selected I/O Device 12. The request includes the address in Host System 1 memory where the I/O data read by the I/O Device is to be written. Host System 2 then sends a request for I/O to I/O Unit 14. When the requested data is read from the I/O Device 12, the data is transferred to memory within Host System 2 16. Upon receipt, Host System 2 forwards the data to the specified location in Host System 1. In a second example where an I/O write is requested, Host System 1 sends a request including the data to be written to Host System 2. This data is thus forwarded from memory in Host System 1 to memory in Host System 2. Host System 2 forwards the data to local memory in I/O Unit 14 for transfer to I/O Device 12.

With the advent of new intelligent I/O standards, peer-to-peer I/O processing, and clustering of host systems, there is a need to securely direct I/O transactions between an I/O device and memory outside of the physical memory domain available to the I/O device, thereby avoiding the double movement of I/O data illustrated above and improving the overall efficiency of the computer system. Furthermore, directing data movement during I/O operations between an I/O unit and a first host system without requiring a second host system to forward the data would be especially advantageous in a clustered system environment.

SUMMARY OF THE INVENTION

An embodiment of the present invention is a method for directing transfer of I/O data of an I/O device to other processing units in a computer system. The system has at least first and second processing units. The second processing unit controls access to an I/O unit coupled to an I/O device. The first and second processing units and the I/O unit are coupled to an interconnect fabric. The method includes the steps of registering memory fragments of the first processing unit with the interconnect fabric to get memory handles for the memory fragments; creating a list, the list having an identifier of the first processing unit, the memory handles, and virtual addresses and lengths of the memory fragments; sending the list from the first processing unit to the second processing unit; sending the list from the second processing unit to the I/O unit; examining the identifier of the first processing unit and determining a communications connection from the I/O unit to the first processing unit; and transferring I/O data over the communications connection between the I/O unit and memory referenced by the memory handles and virtual addresses.

BRIEF DESCRIPTION OF THE DRAWINGS

The features and advantages of the present invention will become apparent from the following detailed description of the present invention in which.

DETAILED DESCRIPTION OF THE PRESENT INVENTION

The present invention allows operating system (OS) software executing on a second host system to direct an I/O device to transfer data directly between a requesting application program's buffers on a first host system and an I/O unit coupled to the I/O device without the need to pass through the OS. Since the OS retains control of the I/O request, it maintains security and protection features at the same time as realizing increases in performance gained from not having to participate in the actual data transfer (i.e., reduced CPU utilization and reduced memory bandwidth utilization).

The present invention allows for direct movement of data between an I/O device and buffers specified by a requesting application program. This capability is especially useful when the requesting application program's buffers reside outside the I/O unit's physical addressing domain. This direct movement capability is useful for supporting peer-topeer operation where a number of different I/O units, each with its own physical memory addressing domain, require access to the same I/O device. Here, peer-to-peer means transporting data and control structures between different I/O units within a computer system. The direct movement capability is also useful in clustered systems. A cluster is a collection of processing units (either host systems or I/O units) interconnected by a single logical fabric that collectively function as a single computer system. The present invention allows clustered host systems direct access to an I/O device for data transfer without intervention by the OS of the host system owning the I/O device. The present invention also allows processing of a single I/O command to collect data from multiple units and/or distribute the I/O data to multiple units.

Two enabling technologies supporting an embodiment of the present invention are the Virtual Interface (VI) Architecture and the Intelligent I/O (I2O) Architecture. The VI Architecture defines a hardware/software interface for high-performance, scaleable communication components that link collections of computers into clusters. It is defined in the Virtual Interface Architecture Specification, Version 1.0, published Dec. 16, 1997, and incorporated herein by reference. A virtual interface (VI) is a communications interface between a network interface controller (NIC) and a process allowing a NIC direct access to the process's memory. A VI consists of a pair of work queues, one for send operations and the other for receive operations, that store a packet descriptor between the time it is posted and the time a completion operation is used to detect that the NIC has completed processing of the packet descriptor. A pair of VIs are associated using a connect operation to allow packets sent at one VI to be received at the other. A packet descriptor is a data structure for allowing a process to express its intent to have data moved between memory and an interconnect fabric. The packet descriptor is organized as a list of segments specifying a data movement operation and associated parameters.

The objective of the VI Architecture is to minimize the software overhead incurred to perform communication between processes within a cluster. The VI Architecture is a strategy for inter-node message passing that enables processes to directly access a network interface controller (NIC), thereby reducing overhead, so that application programs better utilize a fast interconnect fabric. The fast interconnect fabric is a collection of hardware elements, such as routers, switches, connectors, and cables, that interconnect a set of processing nodes in a system area network (SAN). A SAN is comprised of one or more interconnect fabrics, to which are attached host systems and I/O units. An I/O unit is an autonomous system including one or more processors, memory, one or more I/O processors (IOPs), and other local I/O resources. An IOP is a collection of I/O device drivers and their adapters or controllers sharing the same processor and resources. Each IOP has its own virtual address space (i.e., the IOP's local address space), it can access the I/O unit's physical address space, and it can access remote memory through a remote transport agent.

The I2O architecture was developed as a result of the computer industry demand for I/O device driver portability between OS and host platforms, combined with increasing demands for intelligent, distributed I/O processing. The I2O architecture is defined by the I2O special interest group (SIG) in the Intelligent I/O (I2O) Architecture Specification, version 1.5, March 1997, incorporated herein by reference. The basic objective of I2O is to provide an I/O device driver architecture that is independent of both the specific I/O device being controlled and the host OS. This is achieved by logically separating the portion of the driver that is responsible for managing the I/O device from the specific implementation details for the OS that it serves. By doing so, the part of the driver that manages the device becomes portable across multiple operating systems. I2O also acts to hide the nature of the communication between various mechanisms, and in doing so provides processor and bus technology independence.

The I2O system is also designed to facilitate intelligent I/O subsystems, with support for message passing between multiple independent I/O units. By relieving the host processor of interrupt-intensive I/O tasks required by the various layers of I/O device driver architecture, the I2O system improves I/O performance. I2O-compatible systems efficiently deliver the I/O throughput required by a wide range of high bandwidth applications. At the same time, I2O imposes no restrictions as to where the layered I/O software modules execute, providing support for single processor, multiprocessor, and clustered systems.

The present invention specifies enhancements to the I2O Architecture that permits the OS of a first host system to instruct the I/O device to transfer the I/O data directly between the I/O unit controlling the I/O device and a second host system or I/O unit. The controlling I/O unit is able to perform this direct data transfer because of enhancements to data descriptor lists that specify the source and destination of data for I/O transactions and the provision of a mechanism for the I/O device to transfer data beyond the controlling I/O unit's physical memory domain.

Figure 2:
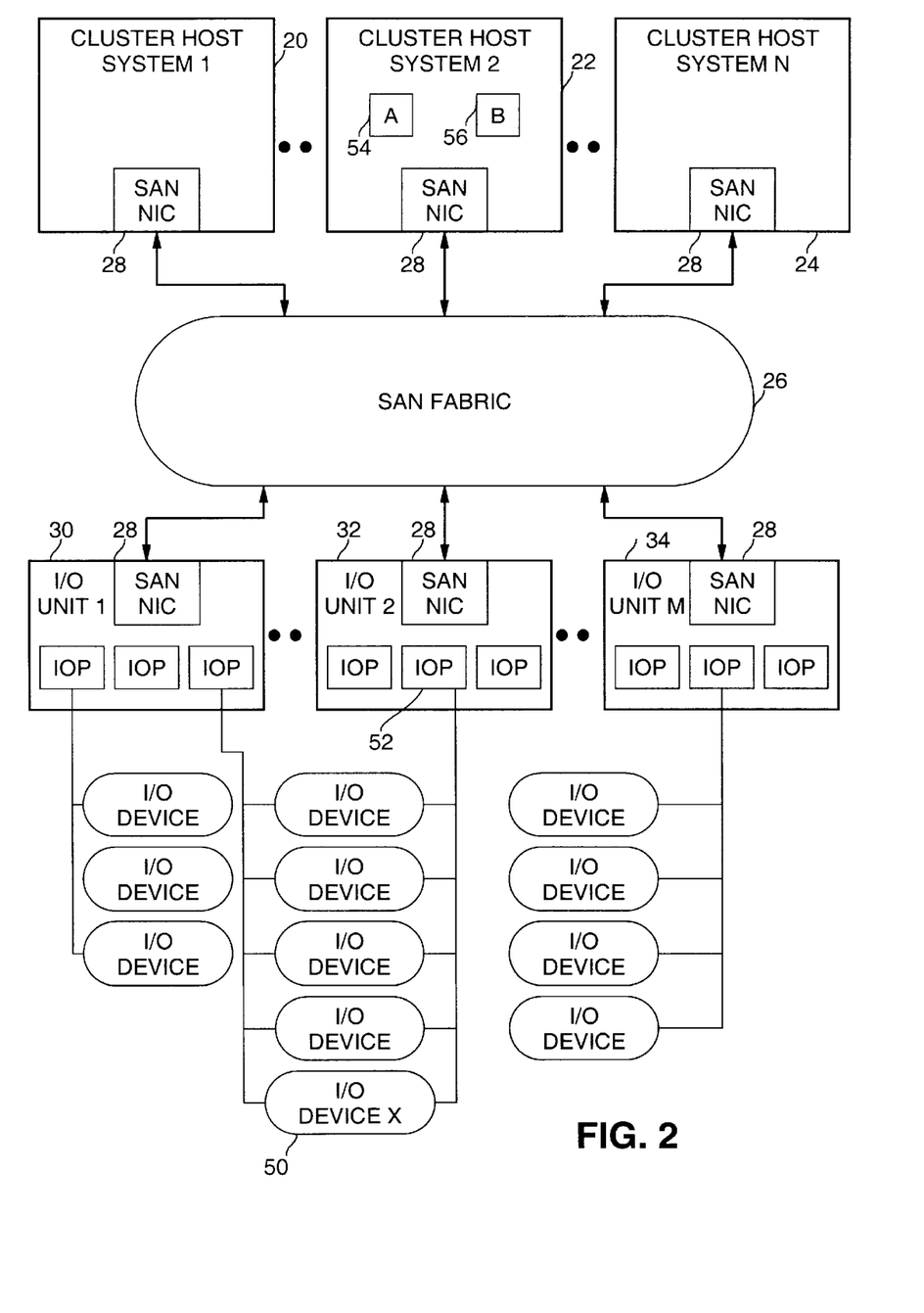
FIG. 2 is a diagram illustrating multiple host systems accessing multiple I/O units via a SAN fabric according to an embodiment of the present invention.

FIG. 2 is a diagram illustrating multiple host systems accessing multiple I/O units via a SAN fabric according to an embodiment of the present invention. Cluster Host Systems 1, 2 and N, numbered 20, 22, and 24, respectively, communicate with each other via System Area Network (SAN) Fabric 26. Although three host systems are shown in FIG. 2, any number of host systems may be interconnected by the SAN Fabric. Host systems may also be thought of as servers. A server is a compute node executing an appropriate high level operating system. However, the term is generic and could also apply to other computers such as desktop personal computers (PCs) and workstations. Each Cluster Host System includes a SAN Network Interface Controller (NIC). The SAN NIC attaches to any local bus within a host or I/O unit. Host systems and I/O units are generically called units. A unit may have multiple SAN NICs installed. SAN NICs attach a unit to the SAN Fabric. The SAN NIC provides connections to other units that are external to the unit.

The operation of the SAN NIC is abstracted by a Remote Transport Agent (RTA) (not shown). The RTA is the component in each unit that manages connections between the unit and other units and provides transport resources to exchange messages and data between various units. It abstracts reliable point-to-point communication between pairs of host units and IOPs in a SAN. Through the RTA, a host unit establishes a logical connection with an IOP with which it needs to communicate. Such connections may be created once and maintained for every possible communication endpoint, or created and deleted dynamically as needed to support I/O request operations. An IOP has exactly one logical communication endpoint to each host unit, independent of the number of SAN NICs actually configured.

I/O Units 1, 2 and M, numbered 30, 32, and 34, respectively, communicate with the Cluster Host Systems and each other through the SAN Fabric 26. Although three I/O units are shown in FIG. 2, any number of I/O units may be interconnected by the SAN Fabric. Each I/O unit includes one or more IOPs that share the same physical address space. Connected to an IOP are zero or more I/O devices.

In this embodiment, the capability for remote I/O is provided. In contrast to local I/O where a host system has exclusive access to an IOP through a local bus interface, remote I/O has the following characteristics. Host systems access a remote IOP via the SAN which interconnects host systems and I/O units. Multiple host systems and I/O units may access a remote IOP concurrently, subject only to host system OS software policies. IOP adapters (not shown) within an I/O unit cannot directly address and access memory residing in host systems or other I/O units, but rather they directly or indirectly use the service of a remote transport agent.

The SAN includes a data transport model. The model provides for sending messages and data across the network. The SAN NICs interconnect all host systems and I/O units through the SAN Fabric. The SAN NICs provide protection so a remote unit can only access memory that it has been authorized to access. The SAN hardware can send data with no extra data copies. For a read operation, the sender tells the SAN at a local end both the source location of data in the local unit to be transferred and the destination location in a remote unit. The SAN directly moves the data across the SAN Fabric from the local unit into the desired place in the remote unit without further copies of data being made. To do this, it requires the destination unit to register the memory where the data resides with the SAN NIC. The SAN NIC returns a memory handle as a memory protection key. The SAN NIC sends the memory handle and the virtual address of the data to the remote unit to initiate the data transfer. The memory handle and virtual address are sufficient for accessing memory in a particular unit. Additionally, for access to a remote unit, a platform identifier is used to identify the unit where the memory handle and virtual address are valid. Thus, the combination of a platform identifier, a memory handle for registered memory, and a virtual address uniquely identifies memory located anywhere in the clustered computer system.

Units pass data to each other by providing a structured list of memory addresses that specifies data buffers and their respective lengths. A data buffer is memory shared between a sender and receiver for the purpose of holding I/O data. The memory of a data buffer can be scattered, rather than contiguous, and allocated as page frames. This mechanism for communicating the location of data to be transferred within the SAN is generally called a data descriptor list. In an embodiment of the present invention, the data descriptor list is called a Scatter-Gather List (SGL). The SGL can indicate any number of buffers, each of which can contain any number of segments (memory fragments). The information passed from sender to receiver explicitly defines the data buffers involved in each remote I/O transaction.

A SGL describes a plurality of possibly disjoint fragments of memory. It can be used to distribute data in a logical buffer into different fragments of memory (i.e., "scatter") and collect memory fragments into a single logical buffer (i.e., "gather"). The SGL defines all fragments making up a buffer. It can also identify multiple buffers. The SGL is passed from a process in a unit making an I/O request to the unit controlling the I/O transaction. A transaction includes zero or more data buffers that contain the source data, zero or more data buffers where the results of the transaction are placed, and additional parameters providing details about the specific transaction. A request message provides information about one or more transactions, where each transaction contains any number of these components. The SGL provides a structured method for indicating each component.

The SGL specifies source data by identifying a buffer, which may contain multiple segments. A large segment of data is generally indicated by its location in common memory. This provides efficiency since only the data's location is passed between the sending and receiving units and only the receiving unit moves the data. For smaller data segments, the data itself may be supplied in the SGL. This is useful when intermediate processes need the content of that segment, or when the size of the data is not much larger than the size of structures specifying the data buffer.

Figure 3:
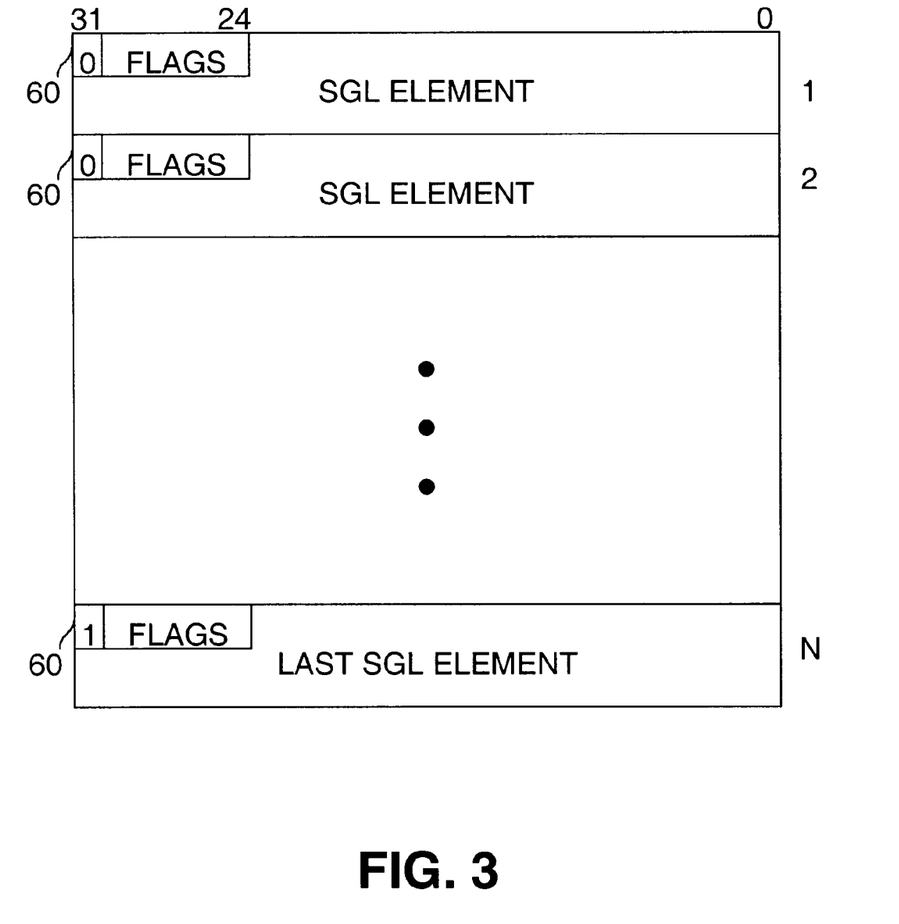
FIG. 3 is a diagram of the physical structure of a Scatter-Gather List sequence.

FIG. 3 is a diagram of the physical structure of a Scatter-Gather List sequence. It shows the structure of a typical SGL. The structure consists of variable length elements. The most significant bit of the first word in each element is the Last Element flag 60, which identifies the last element in the sequence. A chain pointer may also be included to indicate a buffer containing an additional sequence of elements. The pointer appends logically to the end of the original sequence.

Figure 4:
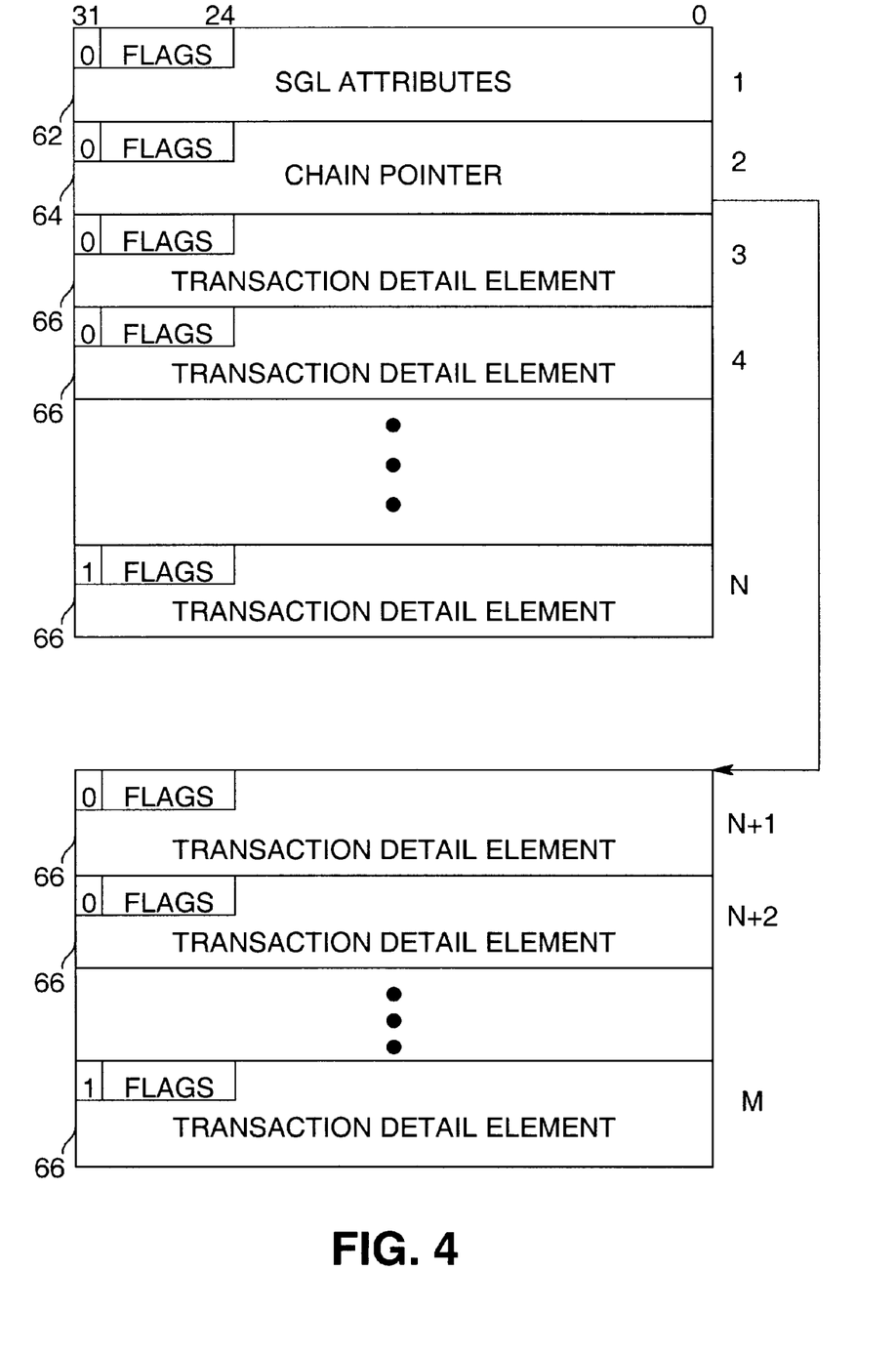
FIG. 4 is a diagram of how various element types may be arranged to form the logical structure of a Scatter Gather List.

FIG. 4 is a diagram of how various element types may be arranged to form the logical structure of an SGL. The example of FIG. 4 shows M number of elements; N are present in the message and M–N are in the additional list elsewhere in memory. The first element in the sequence is reserved for SGL attributes 62. The content of the SGL attributes element is necessary only if the attributes of the SGL differ from the default case or the SGL is transported to another unit. SGL attributes include address size, context size, and page frame size. If the SGL Attributes element is absent, the default attributes are used. When it is present, it is always the first element. An entire SGL contains, at most, a single SGL Attributes element.

Figure 5:
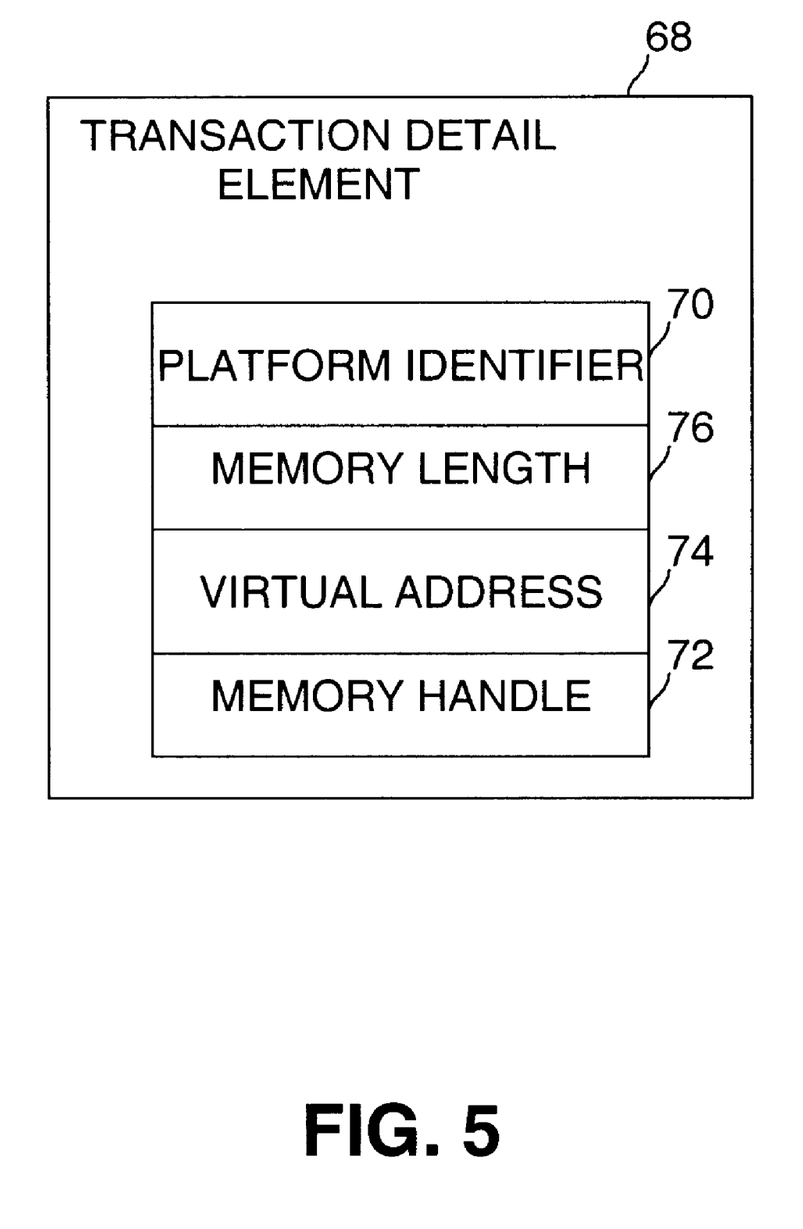
FIG. 5 is a diagram of a transaction detail element.

The next element in the order is reserved for an SGL Chain Pointer 64. The SGL Chain Pointer element provides the size and location of the buffer containing the remainder of the SGL. If the SGL Chain Pointer element is absent, the SGL is a single sequence of elements with all elements present in the message frame. When an SGL Chain Pointer is present, it is always the first or second element. Optionally, additional Chain Pointers may follow. The remainder of the SGL contains zero or more sets of transaction detail elements 66. A transaction set contains any number of detail elements specifying data buffers and transaction parameters. A data buffer is one or more segments of memory that either contains the source data to be operated on (for a write operation) or stores the results of the operation (for a read operation). It defines a logically contiguous data structure. FIG. 5 is a diagram of a transaction detail element. The transaction detail element 68 includes the platform identifier 70, the memory handle 72, the virtual address 74 and length of the data 76. However, since the platform identifier may be the same for many transaction detail elements, it could be specified only once for a plurality of transaction detail elements and not repeated for each element.

The default location of a data buffer is a unit's local physical memory. By defining an additional element (i.e., the platform identifier), the unit is able to identify memory locations on another unit in the clustered computer system. This includes other host systems or processors, IOPs in other I/O units, and IOPs within the same I/O unit. To provide complete flexibility, the platform identifier must specify both the I/O unit and the IOP (which relates to a process ID).

In addition, the transaction detail element also provides a memory handle. The combination of the process ID and the memory handle add the ability for protected I/O operations as well as the ability to specify virtual memory.

The mechanism for the I/O device to transfer data beyond the I/O unit's physical memory domain is the ability to create a Remote Direct Memory Access (RDMA) object. A RDMA object identifies memory registered by a process that is accessible by a remote transport agent. The I/O device creates a RDMA object specifying the platform ID. The RDMA allows the I/O device to directly use the transport for transferring data between the I/O device and a remote process. If a suitable virtual interface (VI) does not exist, the I/O Unit creates a VI and connects it to the remote process. Once the RDMA object is created, the I/O device uses it to access the remote transport capabilities of the I/O Unit and move data directly to and from the originator's buffers.

Returning to FIG. 2, a high level flow of processing is described as follows. For example, suppose a process on Cluster Host System 2 22 requires access to an I/O Device X 50. Furthermore, assume I/O Device X is controlled by IOP 52 within I/O Unit 2 32, and that I/O Unit 2 is controlled primarily by Cluster Host System 1 20. To gain access to the requested I/O device, Cluster Host System 2 22 creates and sends a request for I/O access containing a SGL to Cluster Host System 1 20 via the SAN Fabric 26. Cluster Host System 1 validates the I/O request and sends it to I/O Unit 2 32 in a control message. The I/O Unit parses the SGL, correlating the platform identifier to the connection that it needs to transfer data directly between the I/O Unit and the Cluster Host System 2, sets up a new connection to Cluster Host System 2 if necessary, and then transfers the data according to the memory handle and virtual addresses contained in the SGL.

An example of a read operation according to an embodiment of the present invention is described as follows. Assume that a process on Cluster Host System 2 22 needs to read data from I/O Device X 50 and that I/O Device X is controlled by IOP 52 within I/O Unit 2 32, and that I/O Unit 2 is controlled primarily by Cluster Host System 1 20. Furthermore, the requesting process on Cluster Host System 2 requires the I/O data to be stored into two separate memory fragments A 54 and B 56. Initially, Cluster Host System 2 22 registers memory fragments A and B with its SAN NIC 28. Cluster Host System 2 supplies the virtual addresses and lengths for memory fragments A and B to the SAN NIC. The SAN NIC 28 returns a memory handle for each fragment. Cluster Host System 2 then creates a SGL that includes the platform identifier for Cluster Host System 2 and the memory handles, virtual addresses, and lengths of the memory fragments. Cluster Host System 2 sends the SGL in a request for a read operation to Cluster Host System 1 20. Cluster Host System 1 includes the SGL in a base class request to I/O Unit 2 32, communicating the request over the SAN Fabric 26 via the SAN NICs. The relevant IOP 52 in I/O Unit 2 examines the platform identifier in the SGL and determines which connection over the SAN NIC is to be used to send the data. As data is read by I/O Device X 50, it is transferred to IOP 52 within I/O Unit 2 32. The IOP sends the data through the SAN Fabric 26 via the SAN NICs 28 to the memory referenced by the memory handle and the virtual address in the SGL for memory fragment A 54. The same processing is performed for sending I/O data to the memory referenced by the memory handle and the virtual address in the SGL for memory fragment B 56.

An example of a write operation according to an embodiment of the present invention is described as follows. Assume that a process on Cluster Host System 2 22 needs to write data to I/O Device X 50 and that I/O Device X is controlled by IOP 52 within I/O Unit 2 32, and that I/O Unit 2 is controlled primarily by Cluster Host System 1 20. Furthermore, the requesting process on Cluster Host System 2 has the data stored in two separate memory fragments A 54 and B 56. Initially, Cluster Host System 2 22 registers memory fragments A and B with its SAN NIC 28. Cluster Host System 2 supplies the virtual addresses and lengths for memory fragments A and B to the SAN NIC. The SAN NIC 28 returns a memory handle for each fragment. Cluster Host System 2 then creates a SGL that includes the platform identifier for Cluster Host System 2 and the memory handles, virtual addresses, and lengths of the memory fragments. Cluster Host System 2 sends the SGL in a request for a write operation to Cluster Host System 1 20. Cluster Host System 1 includes the SGL in a base class request to I/O Unit 2 32, communicating the request over the SAN Fabric 26 via the SAN NICs. The relevant IOP 52 in I/O Unit 2 examines the platform identifier in the SGL and determines which connection over the SAN NIC is to be used to retrieve the data. The data is read from Cluster Host System 2 memory referenced by the memory handle and the virtual address in the SGL for memory fragment A 54, and transferred over the SAN Fabric to the IOP 52 within I/O Unit 2 32. The IOP forwards the data to I/O Device X 50. The same processing is performed for reading I/O data from the memory referenced by the memory handle and the virtual address in the SGL for memory fragment B 56 and writing the data to the I/O Device X 50.

Figure 6:
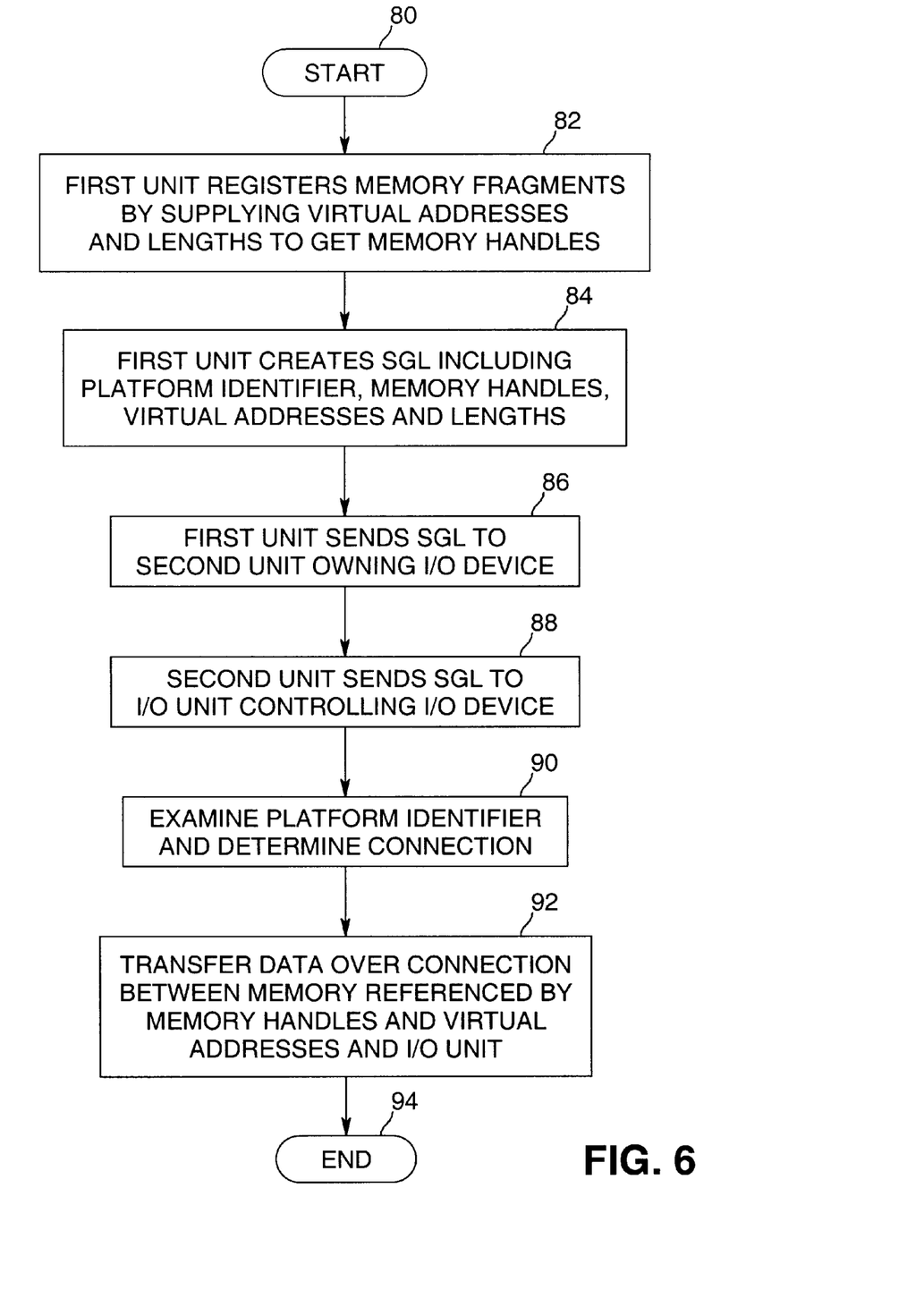
FIG. 6 is a flow diagram of the steps for directing an I/O transaction.

FIG. 6 is a flow diagram of the steps for directing an I/O transaction. After Start 80, a process on a first unit registers one or more memory fragments with its SAN NIC, supplying the virtual addresses and lengths of the memory fragments to get one or more memory handles at step 82. At step 84, the process creates a SGL including the platform identifier of the first unit, the memory handles, the virtual addresses, and the lengths. The SGL is sent in an I/O request by the first unit to a second unit owning the I/O device at step 86. Next, at step 88, the SGL is sent by the second unit to the I/O unit controlling the I/O device. At step 90, the I/O unit examines the platform identifier and determines an appropriate connection of the SAN between the I/O unit and the first unit. At step 92, the data is transferred over the connection between the memory referenced by the memory handles and virtual addresses and the I/O unit. Processing ends at End step 94.

While this invention has been described with reference to illustrative embodiments, this description is not intended to be construed in a limiting sense. Various modifications of the illustrative embodiments, as well as other embodiments of the invention, which are apparent to persons skilled in the art to which the inventions pertains are deemed to lie within the spirit and scope of the invention.

What is claimed is:

1. In a system having first and second processing units, the second processing unit controlling access to an input/output (I/O) unit coupled to an I/O device, and the first and second processing units and the I/O unit coupled to an interconnect fabric, a method of directing transfer of I/O data of the I/O device comprising:

registering memory fragments of the first processing unit with the interconnect fabric to get memory handles for the memory fragments;

creating a list, the list having an identifier of the first processing unit, the memory handles, and virtual addresses and lengths of the memory fragments;

sending the list from the first processing unit to the second processing unit;

sending the list from the second processing unit to the I/O unit;

examining the identifier of the first processing unit and determining a communications connection from the I/O unit to the first processing unit; and transferring I/O data over the communications connection directly between the I/O unit and memory referenced by the memory handles and virtual addresses.

2. The method of claim 1, wherein the transferring step comprises transferring I/O data over the communications connection from the I/O unit to memory in the first processing unit referenced by the memory handles and virtual addresses, without involving the second processing unit, when a requested I/O operation is an I/O read operation.

3. The method of claim 1, wherein the transferring step comprises transferring I/O data over the communications connection from memory in the first processing unit referenced by the memory handles and virtual addresses to the I/O unit, without involving the second processing unit, when a requested I/O operation is an I/O write operation.

4. The method of claim 1, wherein the registering step comprises supplying virtual addresses and lengths of the memory fragments to the interconnect fabric to get the memory handles.

5. The method of claim 1, wherein the communications connection comprises a virtual interface.

6. The method of claim 1, wherein the list comprises a plurality of list elements, each list element comprising a plurality of transaction detail elements, each transaction detail element comprising an identifier of a processing unit, a memory handle, a virtual address and a length of a memory fragment.

7. The method of claim 1, wherein the first processing unit is another I/O unit.

8. An apparatus for directing transfer of I/O data comprising:

an interconnect fabric providing a communications medium;

an I/O unit coupled to the interconnect fabric to send and receive I/O data from an attached I/O device;

a first processing unit coupled to the interconnect fabric to request transfer of I/O data, the first processing unit executing instructions to register memory fragments of the first processing unit with the interconnect fabric by supplying virtual addresses and lengths of the memory fragments to the interconnect fabric to get memory handles for the memory fragments, and to create a list having an identifier of the first processing unit, the memory handles, and virtual addresses and lengths of the memory fragments;

a second processing unit coupled to the interconnect fabric to control access to the I/O unit for transferring I/O data, the second processing unit executing instructions to receive the list from the first processing unit, and to send the list to the I/O unit; and wherein the I/O unit executes instructions to examine the identifier of the first processing unit, to determine a communications connection in the interconnect fabric from the I/O unit to the first processing unit, and to transfer I/O data over the communications connection between memory referenced by the memory handles and virtual addresses and the I/O unit.

9. The apparatus of claim 8, wherein the communications connection comprises a virtual interface.

10. The apparatus of claim 8, wherein the list comprises a plurality of list elements, each list element comprising a plurality of transaction detail elements, each transaction detail element comprising an identifier of a processing unit, a memory handle, a virtual address and a length of a memory fragment.

11. A system for directing transfer of I/O data to and from an I/O device comprising:

means for communicating data between system components;

means coupled to the communicating means for sending I/O data to and receiving I/O data from the I/O device;

means coupled to the communicating means for requesting transfer of I/O data, for registering memory fragments with the communicating means by supplying virtual addresses and lengths of the memory fragments to the communicating means to get memory handles for the memory fragments, and for creating a list having an identifier of the requesting means, the memory handles, and virtual addresses and lengths of the memory fragments;

means coupled to the communicating means for controlling access to the sending and receiving means for transferring I/O data, for receiving the list from the requesting means, and for sending the list to the sending and receiving means; and wherein the sending and receiving means further comprises means for examining the identifier of the requesting means, for determining a communications connection in the communicating means between the sending and receiving means and the requesting means, and for transferring I/O data over the communications connection between memory referenced by the memory handles and virtual addresses and the sending and receiving means.

12. The system of claim 11, wherein the communications connection comprises a virtual interface.

13. The system of claim 11, wherein the list comprises a scatter-gather list having a plurality of list elements, each list element comprising a plurality of transaction detail elements, each transaction detail element comprising an identifier of the requesting means, a memory handle, a virtual address and a length of a memory fragment.

14. The system of claim 11, wherein the requesting means, the controlling means, and the sending and receiving means each further comprise a network interface controller for communicating with the communicating means.

15. The system of claim 11, wherein the requesting means and the sending and receiving means are I/O units.

16. A machine readable medium having stored therein a plurality of machine readable instructions designed to be executed by a plurality of processing units, the machine readable instructions for registering memory fragments of a first processing unit with an interconnect fabric to get memory handles for the memory fragments; for creating a list, the list having an identifier of the first processing unit, the memory handles, and virtual addresses and lengths of the memory fragments; for sending the list from the first processing unit to a second processing unit; for sending the list from the second processing unit to an I/O unit; for examining the identifier of the first processing unit and determining a communications connection from the I/O unit to the first processing unit; and for transferring I/O data over the communications connection between the I/O unit and memory of the first processing unit referenced by the memory handles and virtual addresses.

* * * * *